(12) United States Patent
Ogawa et al.

(10) Patent No.: US 8,030,420 B2
(45) Date of Patent: Oct. 4, 2011

(54) OLEFIN POLYMERIZATION REACTION UNIT AND POLYOLEFIN PRODUCTION PROCESS

(75) Inventors: Hiroyuki Ogawa, Ichihara (JP); Hideki Sato, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 239 days.

(21) Appl. No.: 12/332,065

(22) Filed: Dec. 10, 2008

(65) Prior Publication Data

US 2009/0148354 A1    Jun. 11, 2009

(30) Foreign Application Priority Data

Dec. 11, 2007 (JP) ................. P2007-320169

(51) Int. Cl.
*C08F 2/00* (2006.01)
*C10B 57/02* (2006.01)
(52) U.S. Cl. ............ 526/65; 208/49; 422/132; 422/134; 422/139; 422/144; 422/145
(58) Field of Classification Search .................. 422/132, 422/134, 139, 144, 145; 432/139; 208/49; 526/65
See application file for complete search history.

(56) References Cited

U.S. PATENT DOCUMENTS

| | | | |
|---|---|---|---|
| 2,477,454 A | | 7/1949 | Heath |
| 2,867,506 A | * | 1/1959 | Roberts .......................... 423/542 |
| 2,890,106 A | | 6/1959 | Heath |
| 2,936,303 A | * | 5/1960 | Goins ............................. 526/65 |
| 3,079,222 A | | 2/1963 | Reeve |
| 3,242,586 A | | 3/1966 | Peterson |
| 3,262,922 A | | 7/1966 | Payne |
| 3,495,952 A | | 2/1970 | Ulbrecht |
| 3,644,583 A | | 2/1972 | Scoggin et al. |
| 3,652,527 A | | 3/1972 | Trieschmann et al. |
| 3,719,029 A | | 3/1973 | Suzukawa et al. |
| 3,770,714 A | * | 11/1973 | Dorschner et al. .............. 526/65 |
| 3,776,979 A | * | 12/1973 | Hill .................................. 525/53 |

(Continued)

FOREIGN PATENT DOCUMENTS

CA          739660 A       8/1966

(Continued)

OTHER PUBLICATIONS

"Terminology Dictionary of Powder Technology, 2nd Edition", Editor Society of Power Technology, Nikkan Kogyo Shimbun-sha, 2000, p. 321.
Hattori et al., "Minimum spoutable gas flow rate in side-outlet spouted bed with inner draft-tube," Journal of Chemical Engineering of Japan, vol. 14, No. 6, Apr. 3, 1981, pp. 462-466.

(Continued)

*Primary Examiner* — Walter Griffin
*Assistant Examiner* — Huy-Tram Nguyen
(74) *Attorney, Agent, or Firm* — Birch, Stewart, Kolasch & Birch, LLP

(57) ABSTRACT

An olefin polymerization reaction unit includes a multistage gas phase polymerization reactor which is divided into two or more polymerization stages, in which polyolefin particles move from an initial stage to a final stage, and in which an olefin monomer-containing gas is fed from the final stage toward the initial stage. The reaction unit also includes first circulating means for feeding to the final stage a gas that is discharged from the initial stage and then cooled with a first heat exchanger, and second circulating means for feeding to one of the polymerization stages a condensate formed by condensing, with a second heat exchanger different from the first heat exchanger, a gas removed from one of the polymerization stages.

5 Claims, 3 Drawing Sheets

U.S. PATENT DOCUMENTS

| | | | |
|---|---|---|---|
| 3,957,448 A | | 5/1976 | Shepard et al. |
| 3,971,768 A | | 7/1976 | Peters et al. |
| 4,129,701 A | | 12/1978 | Jezl et al. |
| 4,337,722 A | | 7/1982 | Debayeux et al. |
| 4,373,272 A | | 2/1983 | Jones et al. |
| 4,404,083 A | | 9/1983 | Vasalos |
| 4,419,330 A | | 12/1983 | Ishihara et al. |
| 4,441,822 A | | 4/1984 | Biswas et al. |
| 4,457,896 A | | 7/1984 | Kono |
| 4,466,082 A | | 8/1984 | Zoschak et al. |
| 4,518,750 A | | 5/1985 | Govoni et al. |
| 4,533,367 A | * | 8/1985 | Hadzismajlovic ............ 95/211 |
| 4,640,339 A | | 2/1987 | Klaren |
| 4,744,413 A | | 5/1988 | Klaren et al. |
| 5,034,195 A | * | 7/1991 | Platz ............................ 422/134 |
| 5,213,768 A | | 5/1993 | Maurel et al. |
| 5,235,009 A | | 8/1993 | Hogan |
| 5,245,093 A | * | 9/1993 | Ember ......................... 585/266 |
| 5,536,378 A | * | 7/1996 | Gibson et al. ................ 204/234 |
| 5,674,308 A | | 10/1997 | Meissner et al. |
| 5,676,201 A | | 10/1997 | Klaren |
| 6,066,701 A | | 5/2000 | Koveal et al. |
| 6,306,981 B1 | | 10/2001 | Brown et al. |
| 6,441,108 B1 | | 8/2002 | Haendeler et al. |
| 6,444,763 B1 | | 9/2002 | Sagae et al. |
| 6,518,372 B1 | | 2/2003 | Weickert |
| 6,689,845 B1 | | 2/2004 | Govoni et al. |
| 7,601,303 B1 | | 10/2009 | Karer et al. |
| 2006/0058474 A1 | | 3/2006 | Covezzi et al. |
| 2006/0063896 A1 | | 3/2006 | McElvain et al. |
| 2007/0217966 A1 | | 9/2007 | Heino et al. |
| 2009/0149610 A1 | | 6/2009 | Sato et al. |
| 2009/0149620 A1 | | 6/2009 | Sato et al. |
| 2010/0069581 A1 | | 3/2010 | Ogawa et al. |
| 2010/0311923 A1 | | 12/2010 | Sato et al. |

FOREIGN PATENT DOCUMENTS

| | | |
|---|---|---|
| EP | 0088638 A2 | 9/1983 |
| EP | 0 101 893 A2 | 3/1984 |
| EP | 0241947 A2 | 10/1987 |
| EP | 0381364 A1 | 8/1990 |
| EP | 1464343 A1 | 12/2004 |
| GB | 845655 A | 8/1960 |
| GB | 954078 A | 4/1964 |
| GB | 1147273 | 4/1969 |
| GB | 1233106 A | 5/1971 |
| GB | 1 351 624 A | 5/1974 |
| GB | 1 587 891 A | 4/1981 |
| GB | 2 077 628 | 12/1981 |
| JP | 66-216735 A | 12/1963 |
| JP | 41-12916 | 7/1966 |
| JP | 46-11670 | 3/1971 |
| JP | 46-31969 | 9/1971 |
| JP | 47-42379 | 10/1972 |
| JP | 58-201802 A | 11/1983 |
| JP | 59-42039 A | 3/1984 |
| JP | 59-21321 | 5/1984 |
| JP | 59-126406 A | 7/1984 |
| JP | 2-233708 A | 9/1990 |
| JP | 6-76239 B2 | 9/1994 |
| JP | 2675919 B2 | 7/1997 |
| JP | 2000-302807 | 10/2000 |
| JP | 2002-515516 A | 5/2002 |
| JP | 2002-520426 A | 7/2002 |
| JP | 2002-537420 A | 11/2002 |
| JP | 3352059 B2 | 12/2002 |
| JP | 2003-277412 | 10/2003 |
| JP | 2006-502263 A | 1/2006 |
| WO | WO 93/24533 A1 | 12/1993 |
| WO | WO 99/59712 A1 | 11/1999 |
| WO | WO 02/40547 A1 | 5/2002 |
| WO | WO-2007/071527 A1 | 6/2007 |

OTHER PUBLICATIONS

Mathur et al., "Spouted Beds", Academic Press, 1974, pp. 114-116 and 279-280.

Perry et al., "Solids-Drying Equipment", Perry's Chemical Engineers' Handbook, McGraw-Hill, 1997, pp. 12-75 and 12-76.

Takeda et al., "Modified types of Spouted bed—With the gas outlet located in the side wall surrouding the annular dense bed," Kagaku Kogaku Ronbunshu 1, Kagaku Kogaku Kyokai, No. 2, 1975, pp. 149-154.

U.S. Office Action dated Jun. 15, 2010 for related U.S. Appl. No. 12/332,055.

Office Action in U.S. Appl. No. 12/332,112 mailed Jun. 3, 2010.

Search Report from Singapore Application No. 200809160-5 dated May 26, 2009.

Search Report from Singapore Application No. 200809158-9 dated Jun. 4, 2009.

Search Report from Singapore Application No. 200809157-1 dated Jun. 4, 2009.

Search Report from Singapore Application No. 200809159-7 dated Jun. 4, 2009.

Search Report from Singapore Application No. 200809161-3 dated Jun. 4, 2009.

Notice of Allowance issued Mar. 18, 2011, in copending U.S. Appl. No. 12/332,112.

Office Action issued Mar. 11, 2011, in copending U.S. Appl. No. 12/331,730.

Office Action issued Mar. 16, 2011, in copending U.S. Appl. No. 12/332,102.

Singapore Search Report issued Nov. 10, 2010, in Singapore Patent Application No. 201004966-6.

Office Action issued Nov. 12, 2010, in copending U.S. Appl. No. 12/332,112.

Hatate et al. "Flow Characteristics of Draft Tube Spouted Bed and its Application", Journal of the Society of Powder Technology, vol. 34, No. 5, May 1997, pp. 343-360.

Ishikura et al., "Hydrodynamics of a Spouted Bed with a Porous Draft Tube", Kagaku Kougaku Ronbunshu, vol. 22, No. 3, 1996, pp. 615-621.

Ishikura et al., "Hydrodynamics of Modified Spouted Beds for Binary Mixtures of Particles—Effect of the Aeration Gas Flow Rate from Side Distributor", Fukuoka University Journal of Engineering, No. 58, Mar. 1997, pp. 155-165.

Ishikura, "Regime Map of Binary Particle Mixture in a Spout-Fluid Bed," Kagaku Kougaku Ronbunshu, vol. 19, No. 6, 1993, pp. 1189-1192.

Notice of Allowance dated Apr. 18, 2011 for U.S. Appl. No. 12/332,102.

Notice of Allowance dated Apr. 21, 2011 for U.S. Appl. No. 12/331,730.

Search Report dated Apr. 22, 2009 for Singapore Application No. 200809160-5.

Takenaka et al., "Fluidity characteristics of a spouted bed with a cylinder to cone-shaped perforated draft tubes," SCEJ 71st Annual Meeting, J123, 2006, 1 page.

Weickert et al., "New Reactor Concepts for the Gas-Phase Polymerization of Olefins," Chemie Ingenieur Technik, vol. 77, No. 8, 2005, pp. 977-978.

Yokokawa, "Fluidizing characteristics of fluidized bed and spouted bed, and their application", Journal of the Society of Powder Technology, vol. 21, No. 11, Nov. 1984, pp. 715-723.

Office Action issued May 26, 2011, in copending U.S. Appl. No. 12/332,112.

Search Reoprt issued Jun. 30, 2011, in Singapore Patent Application No. 201008798-9.

* cited by examiner

OLEFIN POLYMERIZATION REACTION UNIT AND POLYOLEFIN PRODUCTION PROCESS

BACKGROUND OF THE INVENTION

1. Field of the Invention

The present invention relates to an olefin polymerization reaction unit and to a process for producing polyolefins using such an reaction unit.

2. Related Background Art

Olefin polymerization may be carried out by polymerizing an olefin monomer in the presence of a catalyst and forming granular polyolefin particles. One such process that is known to the art involves carrying out polymerization using a single-stage gas phase polymerization reactor having one polymerization stage, using a single heat exchanger to cool and partially condense unreacted monomer-containing gases recovered from the polymerization reactor, and carrying out heat removal within the single-stage gas phase polymerization reactor by again feeding the gases and condensate to the polymerization reactor (see, for example, Japanese Patent Application Laid-open No. 2000-302807).

Olefin polymerization is also carried out by a process that uses a multistage gas phase polymerization reactor which is divided into two or more polymerization stages, wherein polyolefin particles move from an initial stage to a final stage and, at the same time, an olefin monomer-containing gas is fed from the final stage toward the initial stage (see, for example, U.S. Pat. No. 5,235,009 and Japanese Patent Application Laid-open No. 2003-277412). Heat of reaction removal in such a multistage gas phase polymerization reactor is generally carried out by using a heat exchanger to lower the temperature of unreacted monomer-containing gases recovered from the initial stage of the polymerization reactor, then feeding the gases again to the final stage of the polymerization reactor.

SUMMARY OF THE INVENTION

However, in such a method for removing the heat of reaction within a multistage gas phase polymerization reactor, owing to the rising gas temperature associated with heat removal, the temperature within the reactor is higher at higher stages in the reactor, which results in large differences in the reaction temperature. On the other hand, by using a heat removal method in which the heat of reaction in a multistage gas phase polymerization reactor such as that described above is removed by feeding an unreacted monomer condensate to the polymerization reactor, temperature differences between the stages can be minimized. Yet, the gases newly generated by evaporation of the condensate causes the gas flow rate to rise at successively higher stages of the reactor. As a result, the flow rate of gases that are discharged from the reactor and circulated becomes very large. High-powered equipment is thus required to circulate the gases, which increases the power costs.

It is therefore an object of the present invention to provide an olefin polymerization reaction unit that is able to cool efficiently while cutting power costs in olefin polymerization using a multistage gas phase polymerization reactor which is divided into two or more polymerization stages, in which polyolefin particles move from an initial stage to a final stage, and in which an olefin monomer-containing gas is fed from the final stage toward the initial stage. Another object of the invention is to provide a polyolefin production method which uses such an olefin polymerization reaction unit.

Accordingly, the olefin polymerization reaction unit of the invention includes a multistage gas phase polymerization reactor which is divided into two or more polymerization stages, in which polyolefin particles move from an initial stage to a final stage, and in which an olefin monomer-containing gas is fed from the final stage toward the initial stage; first circulating means for feeding to the final stage a gas that is discharged from the initial stage and then cooled with a first heat exchanger; and second circulating means for feeding to one of the polymerization stages a condensate formed by condensing, with a second heat exchanger different from the first heat exchanger, a gas removed from one of the polymerization stages.

In the olefin polymerization reaction unit of the present invention, the temperature of a portion of the unreacted monomer-containing gas recovered from the initial stage of the multistage gas phase polymerization reactor is lowered by the first heat exchanger, then again fed to the final stage of the polymerization reactor, along with which another portion of the unreacted monomer-containing gas removed from the multistage gas phase polymerization reactor is condensed by a second heat exchanger to form a liquid condensate which is then fed to the multistage gas phase polymerization reactor. Such an arrangement enables the latent heat of vaporization of the monomer component to be utilized, making it possible to carry out efficient heat removal.

Also, because condensation is carried out by a second heat exchanger which is separate and distinct from the first heat exchanger, the amount of gas supplied the first heat exchanger can be reduced. That is, the capacity of the circulating gas compressor which circulates gas in the first circulating means can be lowered, which has a significant power cost-cutting effect.

Meanwhile, the decrease in volume when the gas are condensed results in a negative pressure within the second heat exchanger, causing gases to be automatically drawn into the second heat exchanger. Moreover, the liquid (condensate) formed by condensation of the gas by the second heat exchanger can easily be fed into the polymerization reactor by, for example, the head pressure of the liquid itself; that is, without using a pump. When the head pressure is not high enough, it may be necessary to use a pump. However, even in such cases, it suffices to use the pump only to the extent of compensating for the degree of inadequacy in the head pressure. Hence, although second circulating means is provided, doing so does not raise the power costs to any significant degree. Indeed, the second circulating means has overall a high power cost-cutting effect.

In addition, in the inventive olefin polymerization reactor unit, because the second circulating means both enables gas to be removed from a desired polymerization stage and also enables condensate to be fed to a desired polymerization stage, any polymerization stage can be selectively cooled. The present invention thus has the additional effect of facilitating temperature control within the multistage gas phase polymerization reactor.

Preferably, the second circulating means feeds the condensate to the polymerization stage from which gas is removed, the polymerization stage immediately before the polymerization stage from which gas is removed, or the polymerization stage immediately after the polymerization stage from which gas is removed.

Such an arrangement makes it possible, by feeding the condensate close to the polymerization stage where gas is removed, to replenish at a nearby polymerization stage the amount of gas lost by removal. As a result, the gas flow rate at each polymerization stage within the multistage gas phase polymerization reactor can be kept substantially uniform.

The two or more polymerization stages are preferably arranged in a vertical direction. This makes it possible to reduce the footprint of the reaction unit.

It is preferable for the second heat exchanger to be situated upward from where the condensate is fed to a polymerization stage.

This arrangement readily enables the head pressure of the liquid condensed by the second heat exchanger to be increased, making it easier to supply the condensate to the reactor or to a polymerization stage.

A fluidized bed or a spouted bed of the polyolefin particles may be formed in each polymerization stage. Because multistage gas phase polymerization reactors with such constructions generally have an excellent plug flow character, polyolefin of excellent uniformity can be obtained.

The polyolefin production process of the invention carries out olefin polymerization using the above-described olefin polymerization reaction unit.

The present invention enables efficient cooling to be carried out while at the same time cutting power costs.

DESCRIPTION OF THE PREFERRED EMBODIMENTS

Figure 1:
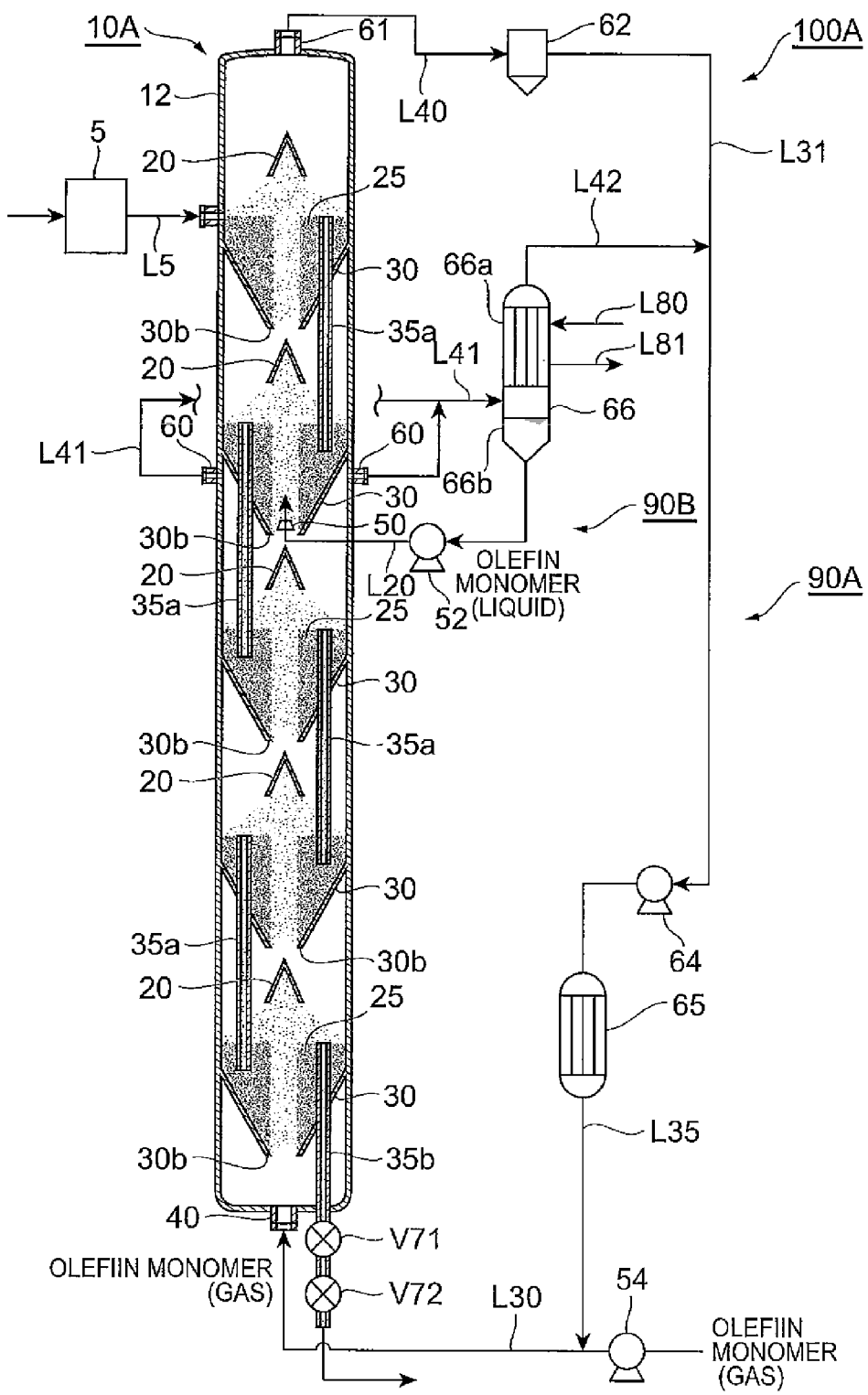
FIG. 1 is a schematic view of an embodiment of the olefin polymerization reaction unit according to the present invention.

Preferred embodiments of the invention are described in detail below while referring to the attached diagrams where necessary. Unless noted otherwise, positional relationships such as up-down and left-right are based on the relative positions shown in the diagrams. Relative dimensions of features shown in the diagrams may not be true to scale.

First Embodiment

Olefin Polymerization Reaction Unit

The olefin polymerization reaction unit 100A according to the present embodiment includes an olefin prepolymerization reactor 5, and a multistage gas phase polymerization reactor 10A connected subsequent to the olefin prepolymerization reactor 5.

Olefin Prepolymerization Reactor

The olefin prepolymerization reactor 5 polymerizes olefin in the presence of an olefin polymerization catalyst to form polyolefin particles.

Examples of the olefin prepolymerization reactor 5 include, but are not limited to, slurry polymerization reactors, bulk polymerization reactors, stirred tank-type gas phase polymerization reactors, and fluidized bed-type gas phase polymerization reactors. Any one of these reactors may be used alone, a plurality of reactors of the same type may be used in combination, or two or more reactors of differing types may be used in combination.

Slurry polymerization reactors that may be used include known polymerization reactors, such as the stirred tank-type reactors and loop-type reactors described in Japanese Patent Publication No. S 41-12916, Japanese Patent Publication No. S 46-11670 and Japanese Patent Publication No. S 47-42379. Slurry polymerization is a process in which a polymerization solvent is prepared by adding an olefin monomer such as propylene or butene to an inert solvent such as an aliphatic hydrocarbon (e.g., propane, butane, isobutane, pentane, hexane, heptane, octane) or an alicyclic hydrocarbon (e.g., cyclopentane, cyclohexane), an olefin polymerization catalyst is dispersed in the polymerization solvent to form a slurry, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.3 to 5 MPaG.

Bulk polymerization reactors that may be used include known polymerization reactors, such as the stirred tank-type reactors and loop-type reactors described in Japanese Patent Publication No. S 41-12916, Japanese Patent Publication No. S 46-11670 and Japanese Patent Publication No. S 47-42379. Bulk polymerization is a process in which an olefin monomer such as propylene or butene is used as the polymerization solvent in the substantial absence of inert solvents such as aliphatic hydrocarbons (e.g., propane, butane, isobutane, pentane, hexane, heptane, octane) and alicyclic hydrocarbons (e.g., cyclopentane, cyclohexane), an olefin polymerization catalyst is dispersed in the polymerization solvent, and polymerization is carried out in a state where the polymer that is formed does not dissolve in the polymerization solvent. Polymerization is carried out at a temperature and pressure at which the polymerization solvent is maintained in a liquid state and the polymer that is formed does not dissolve in the polymerization solvent. The polymerization temperature is generally from 30 to 100° C., and preferably from 50 to 80° C. The polymerization pressure is generally from standard pressure to 10 MPaG, and preferably from 0.5 to 5 MPaG. Stirred tank-type gas phase polymerization reactors that may be used include known polymerization reactors, such as the reactors described in Japanese Patent Application Laid-open No. S 46-11969 and Japanese Patent Publication No. S59-21321. Stirred tank-type gas phase polymerization is a process in which a monomer in a gaseous state is used as the medium and, while maintaining an olefin polymerization catalyst and olefin polymer in a fluidized state within the medium by means of an agitator, the monomer in the gaseous state is polymerized. The polymerization temperature is generally from 50 to 110° C., and preferably from 60 to 100° C. The polymerization pressure should be in a range at which the olefin can be present as a vapor phase within the stirred tank-type gas phase polymerization reactor, and is generally from standard pressure to 5 MPaG, and preferably from 0.5 to 3 MPaG.

Fluidized bed-type gas phase polymerization reactors that may be used include known reactors, such as the reactors described in Japanese Patent Application Laid-open No. S 58-201802, Japanese Patent Application Laid-open No. S 59-126406 and Japanese Patent Application Laid-open No. H 2-233708. Fluidized bed-type gas phase polymerization is a process in which a monomer in a gaseous state is used as the medium and, while maintaining primarily an olefin polymerization catalyst and olefin polymer in a fluidized state within the medium by the flow of the medium, the monomer in the gaseous state is polymerized. In some cases, an agitator is also provided to promote fluidization. The polymerization temperature is generally from 0 to 120° C., preferably from 20 to 100° C., and more preferably from 40 to 100° C. The polymerization pressure should be in a range at which the olefin can be present as a vapor phase within the fluidized bed-type reactor, and is generally from standard pressure to 10 MPaG, preferably from 0.2 to 8 MPaG, and more preferably from 0.5 to 5 MPaG.

Combinations of different reactors are exemplified by a slurry polymerization reactor or a bulk polymerization reactor, to which is subsequently connected a fluidized bed-type gas phase polymerization reactor or a stirred tank-type gas phase polymerization reactor.

Alternatively, a flushing tank for separating unreacted olefin or polymerization solvent from olefin polymer particles may generally be provided between a slurry polymerization reactor or a bulk polymerization reactor and, subsequently connected thereto, a gas phase polymerization reactor such as a fluidized bed-type gas phase polymerization reactor, a stirred tank-type gas phase polymerization reactor or the subsequently described multistage gas phase polymerization reactor 10A. However, such a flushing tank is not always required; particularly in cases where a bulk polymerization reactor is used, a flushing tank is often not provided.

Multistage Gas Phase Polymerization Reactor

The multistage gas phase polymerization reactor 10A is a reactor which carries out, in a substantially gas phase state, an olefin polymerization reaction on polyolefin particles formed by the olefin prepolymerization reactor 5.

Referring to FIG. 1, the multistage gas phase polymerization reactor 10A is composed primarily of a cylinder 12 which extends vertically, a plurality of deflectors 20 provided inside the cylinder 12, and a plurality of tubular baffles (decreasing diameter members) 30 provided inside the cylinder 12. The deflectors 20 and tubular baffles 30 are alternately disposed in the axial direction of the cylinder 12. Also, it is preferable for both the deflectors 20 and the tubular baffles 30 to be disposed coaxially with the center axis of the cylinder 12.

In the multistage gas phase polymerization reactor 10A, five polymerization stages 25 are formed in a vertical row inside the cylinder 12. Each polymerization stage 25 is a region enclosed by the outside surface of a tubular baffle 30, the inside surface of the tubular baffle 30 directly below, and the inside surface of the portion of the cylinder 12 (cylindrical portion) between these two tubular baffles 30. The topmost polymerization stage 25 is a region enclosed by the inside surface of the cylinder 12 at the top thereof, the inside surface of the tubular baffle 30 directly below the top of the cylinder 12, and the inside surface of the portion of the cylinder 12 (cylindrical portion) therebetween.

Within each polymerization stage 25, an olefin-containing gas flows upward at a high velocity from a gas inlet orifice formed at a bottom end 30b of the tubular baffle 30, thereby forming a spouted bed of polyolefin particles.

Figure 2:
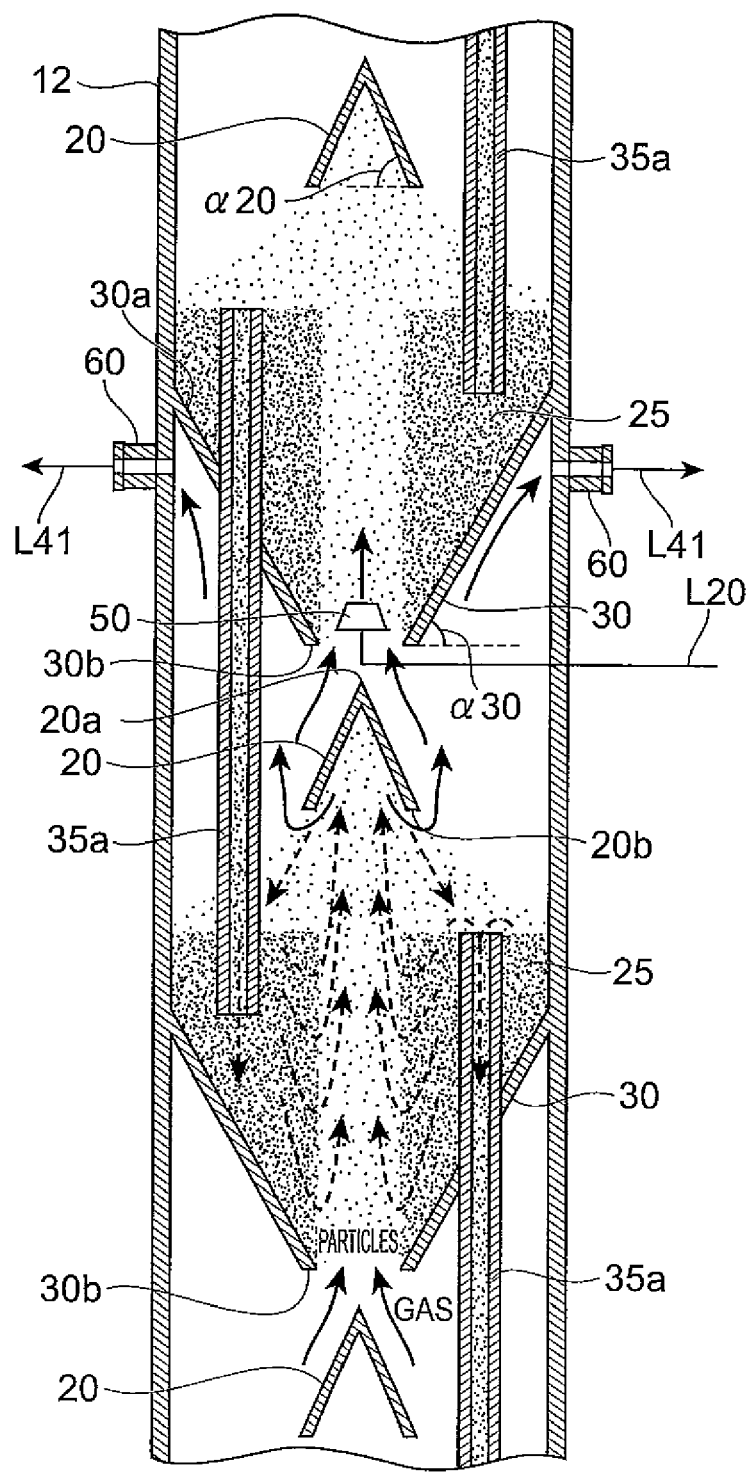
FIG. 2 is an enlarged schematic cross-sectional view of the multistage gas phase polymerization reactor 10A in FIG. 1.

As shown in FIG. 2, in each polymerization stage 25, a deflector 20 is disposed at a position that lies above the tubular baffle 30 and faces the gas inlet orifice. The role of the deflector 20 is to prevent spouted polyolefin particles from scattering to higher stages. This makes it possible to shorten the freeboard zone, enabling a high volume efficiency to be achieved.

The deflector 20 has a conical shape with a top end 20a that is closed, an outside diameter which increases progressively downward, and a bottom end 20b that is spaced apart from the inside wall of the cylinder 12. As a result, particles that have been blown upward collide with the inside surface of the deflector 20 and are taken up into the annular structure of the spouted bed. At the same time, gases circulate upward by passing between the bottom end 20b of the deflector 20 and the inner wall of the cylinder 12.

Each tubular baffle 30 is a tapered cylinder which has an inside diameter that progressively decreases in the downward direction, and has a top end 30a that is contiguous with the inside wall of the cylinder 12. Such an arrangement allows gases to circulate upward from a circular gas inlet orifice at a bottom end 30b of the tubular baffle 30, but does not allow the gases to circulate upward between the top end 30a and the cylinder 12. The gas inlet orifice formed at the bottom end 30b may have disposed thereon a check valve (not shown) so that polyolefin particles within the polymerization stage 25 do not flow downward through the gas inlet orifice at such times as startup or temporary shutdown of the olefin polymerization reactor unit 100A.

As shown in FIG. 1, four upper downcomers 35a are provided so as to pass through each of the four upper tubular baffles 30 within the cylinder 12, and a bottom downcomer 35b is provided in the bottommost tubular baffle 30. The upper downcomers 35a allow polyolefin particles to fall from an upper polymerization stage 25 to a lower polymerization stage 25. The purpose of the bottom downcomer 35b is to remove polyolefin particles from the bottommost polymerization stage and discharge the particles outside of the cylinder 12. Two valves V71 and V72 are arranged in series with the bottom downcomer 35b. The polyolefin particles can be discharged in a subsequent step by successively opening and closing these valves V71 and V72.

To form a stable spouted bed in each polymerization stage 25, it is desirable that each tubular baffle 30 satisfy the following conditions. Namely, the ratio $d_A/d_B$ between the diameter $d_A$ of the gas inlet orifice at the bottom end 30b of the tubular baffle 30 and the inside diameter $d_B$ of the cylinder 12 is preferably 0.35 or less. By using such tubular baffles 30, a stable spouted bed having good particle circulation is easily formed in the reaction zone of each polymerization stage 25. Also, the angle of inclination $\alpha 30$ of the tubular baffle 30 in FIG. 2, i.e., the angle of the inside surface of the tubular baffle 30 with the horizontal, is preferably at least the angle of repose for polyolefin particles present within the cylinder 12. The angle of inclination $\alpha 30$ is more preferably at least the angle of repose and at least the angle at which the polyolefin particles can be completely discharged gravitationally. In this way, smooth downward movement of the polyolefin particles is achieved.

Although a spouted bed can be formed even using a flat plate with a gas inlet orifice formed therein instead of a tubular baffle 30, a region where particles do not fluidize will arise on such a flat plate near the inside surface of the cylinder 12. As a result, due to poor heat removal in this region, the particles may fuse together into masses. To avoid such a situation, it is thus desirable for the tubular baffles 30 to have an angle of inclination $\alpha 30$ which, as noted above, is at least a given angle.

It is preferable for the deflectors 20 in FIG. 2 to have an angle of inclination $\alpha 20$, i.e., the angle formed between the outside surface of the deflector 20 and the horizontal, which is at least the angle of repose for polyolefin particles present within the cylinder 12. In this way, polyolefin particles can be adequately prevented from sticking to the deflectors 20.

Polyolefin particles have an angle of repose of, for example, from about 35° to about 50°. The angles of inclination $\alpha 30$ and $\alpha 20$ are both preferably at least 55°.

The deflectors 20 and tubular baffles 30 are each attached to the cylinder 12 by supports (not shown). The supports have substantially no influence on gas flow and polyolefin flow.

The cylinder 12, deflectors 20 and tubular baffles 30 may be made of, for example, carbon steels and stainless steels such as "SUS 304" and "SUS 316L". As used herein, "SUS" refers to a stainless specification standardized by Japanese Industrial Standards (JIS). It is preferable to use "SUS 316L" when a catalyst which are high in corrosive ingredient (e.g., a halogen such as chlorine) is to be employed.

As shown in FIG. 13 an olefin monomer gas feeding nozzle 40 is provided at the bottom of the cylinder 12, and gaseous olefin monomer is fed to the bottom of the cylinder 12 by way of a line L30 and a compressor 54.

A gas discharge nozzle 61 is provided at the top of the cylinder 12. Gas which has risen up through the cylinder 12 is discharged to the exterior through a line L40, and gas-entrained particles are removed by an optionally provided cyclone 62. The gas is then successively introduced via a line L31 to a circulating gas compressor 64 and a first heat exchanger 65. After the gas introduced to the first heat exchanger 65 has been cooled to a degree that it does not condense, it is introduced via a line L35 into line L30, and thereby recycled to the bottom of the cylinder 12. In addition to the olefin monomer gas feeding nozzle 40, a discharge nozzle (not shown) which is capable of discharging polyolefin particles at the end of reactor operation may also be provided at the bottom of the cylinder 12. Also, to reduce the amount of powder remaining inside the multistage gas phase polymerization reactor 10A at the end of reactor operation, it is preferable to provide an interior member in the shape of an inverted cone (not shown) at a position which does not interfere with gas flow at the bottom of the cylinder 12.

In the present embodiment, first circulating means 90A is composed of the above-mentioned gas discharge nozzle 61, line L40, cyclone 62, line L31, circulating gas compressor 64, line L35, first heat exchanger 65, line L30 and olefin monomer gas feeding nozzle 40. If necessary, the cyclone 62 may be omitted. Also, the order in which the circulating gas compressor 64 and the first heat exchanger 65 are arranged may be reversed.

A plurality of gas discharge nozzles 60 are provided on a portion of the cylinder 12 facing the outside surface of a tubular baffle 30. Specifically, as shown in FIG. 1, gas discharge nozzles 60 are provided on a portion of the cylinder 12 facing the outside surface of the second tubular baffle 30 from the top; i.e., at the third polymerization stage from the top. The gas discharge nozzles 60 are connected via a line L41 to a condensing unit 66.

The condensing unit 66 has a second heat exchanger 66a which condenses gases fed from the line L41, and a reservoir 66b which holds liquid condensate. By way of illustration, the condensing unit 66 may be given a construction which is provided at the top with a second heat exchanger 66a for condensing gases, such as a multitubular cylindrical heat exchanger, and is provided at the bottom with a reservoir 66b for condensed liquid. Here, the olefin monomer-containing gas transferred through line L41 is fed between the second heat exchanger 66a and the reservoir 66b, and the gas flows toward the top of the second heat exchanger 66a. The top of the second heat exchanger 66a and the line L31 are connected together via a line L42. In addition, a coolant feed line L80 and a coolant discharge line L81 are connected to the second heat exchanger 66a.

The cylinder 12 also has provided thereon a liquid feeding nozzle 50 which feeds the condensate held in the reservoir 66b from outside the cylinder 12 into a given polymerization stage 25. Specifically, as shown in FIG. 1, a liquid feeding nozzle 50 is disposed near the gas inlet orifice of the second tubular baffle 30 from the top, i.e., at the second polymerization stage from the top, so as to spray condensate (liquid olefin) toward a spout. This liquid feeding nozzle 50 is connected to the reservoir 66b in the condensing unit 66 by a line L20, and a pump 52 for feeding the required amount of liquefied olefin monomer held in the reservoir 66b is connected to line L20.

In this embodiment, second circulating means 90B is composed of the above-mentioned gas discharge nozzles 60, line L41, second heat exchanger 66a, reservoir 66b, line L20, pump 52 and liquid feeding nozzle 50. The pump 52 is not necessarily essential in cases where the head pressure of the condensate held in the reservoir 66b is sufficiently high, i.e., the liquid level in the reservoir 66b is at a position which is sufficiently higher than the liquid feeding nozzle 50. Accordingly, it is desirable for the second heat exchanger 66a to be situated at a higher position than the liquid feeding nozzle 50. This allows the liquid level of the condensate in the reservoir 66b to be set higher than the liquid feeding nozzle 50, enabling the need for or the requisite capacity of a pump 52 to be reduced.

In this second circulating means 90B, heat is removed from the gas introduced into the second heat exchanger 66a via line L41 until some of the olefin gas condenses, and the condensate drips down and is stored inside the reservoir 66b. The stored condensate is fed through the liquid feeding nozzle 50 into a polymerization stage 25. If necessary, gases such as hydrogen which do not condense are introduced via line L42 into the circulating gas compressor 64 together with the gas discharged by the cyclone 62. The amount of condensate that is formed in the second heat exchanger 66a is set as the amount of condensate required to maintain a given temperature range within the cylinder 12, and the amount of gas discharged from the gas discharge nozzle 60 is regulated by the amount of heat removal in the second heat exchanger 66a or by valves and the like to an amount suitable for generating this required condensate feed rate. In FIG. 1, the liquid feed nozzle 50 is disposed near the gas inlet orifice of the tubular baffle 30. However, the liquid feed nozzle 50 is not limited to such a position and may instead be disposed, for example, near the bottom end of a deflector 20. The liquid feed nozzle 50 is preferably provided in a region having a high gas velocity, such as a spouting area where a spout is formed.

In addition, a line L5 is connected to a position on the cylinder 12 which is higher than the topmost tubular baffle 30, and polyolefin particles containing solid particles of an olefin polymerization catalyst are fed through this line L5 to the topmost polymerization stage 25.

Accordingly, in the present embodiment, a polymerization step which uses two reactors, olefin prepolymerization reactor 5 and multistage gas phase polymerization reactor 10A, is achieved. In this way, the olefin prepolymerization reactor 5 effects the polymerization and growth of polyolefin particles, creating relatively large polyolefin particles having a particle size of preferably at least 500 μm, more preferably at least 700 μm, and even more preferably at least 850 μm, thereby enabling the formation of a more stable spouted bed. However, it is also possible to have the polymerization step be one which does not include the olefin prepolymerization reactor 5 and uses only one reactor. In this case, an olefin polymerization catalyst or prepolymerization catalyst is fed directly to the multistage gas phase polymerization reactor 10A, and olefin polymerization is carried out. Alternatively, one or more additional multistage gas phase polymerization reactor, such as an olefin prepolymerization reactor 5 or a multistage gas phase polymerization reactor 10A, may be provided subsequent to the multistage gas phase polymerization reactor 10A so as to achieve a polymerization step which uses three or more reactors.

Olefin, Polyolefin and Catalyst

Next, the olefin, polyolefin, catalyst and other substances used in such an olefin polymerization reaction unit are described.

In the olefin polymerization reaction unit and polyolefin production process of the invention, polyolefin—i.e., olefin polymer (olefin homopolymer, olefin copolymer)—production is carried out by the polymerization of one or more olefin (homopolymerization or copolymerization). Examples of olefins that may be used in this invention include ethylene, propylene, 1-butene, 1-pentene, 4-methyl-1-pentene, 5-methyl-1-hexene, 1-hexene, 1-heptene and 1-octene.

One or more of these olefins may be used. Alternatively, the olefin used may be changed in each polymerization step. In cases where polymerization is carried out as a multistage process, a different olefin may be used in each stage. When two or more olefins are used, examples of suitable olefin combinations that may be employed include propylene/ethylene, propylene/1-butene, propylene/ethylene/1-butene, ethylene/1-butene, ethylene/1-hexene and ethylene/1-octene. In addition to olefins, it is also possible to use at the same time various copolymeric ingredients such as dienes.

Olefin polymers (homopolymers, copolymers) such as propylene homopolymers, propylene/ethylene copolymers, propylene/1-butene copolymers and propylene/ethylene/1-butene copolymers may be advantageously produced in the present invention. The production of olefin polymers obtained by multistage polymerization in which the proportions of the monomer units serving as the polymer ingredients differ in the respective stages is especially preferred. For example, it is possible to form a multistage-polymerized olefin copolymer by feeding one type of olefin to an olefin prepolymerization reactor 5 and a multistage gas phase polymerization reactor 10A so as to form homopolymer particles, or copolymerizing the first olefin with a small amount of another olefin to form random copolymer particles, then feeding, in a subsequent stage, two or more types of olefin to these polymer particles in an additional olefin polymerization reactor such as an olefin prepolymerization reactor 5 or a multistage gas phase polymerization reactor 10A. This results in a narrow residence time distribution in the multistage gas phase polymerization reactor 10A, making it easy to achieve a fixed compositional ratio within the polymer particles. This approach is especially effective for reducing molding defects.

Examples of such polymers include propylene-propylene/ethylene polymers, propylene-propylene/ethylene-propylene/ethylene polymers, propylene/ethylene-propylene/ethylene polymers and propylene-propylene/ethylene/1-butene polymers. Here, a dash ("-") indicates the boundary between polymers, and a slash ("/") indicates that two or more olefins are copolymerized within the polymer. Of these, the production of multistage-polymerized propylene-based copolymers which are polymers having propylene-based monomer units, are called "high-impact polypropylene" (in Japan, also customarily called "polypropylene block copolymers"), and have crystalline propylene-based polymer segments and amorphous propylene-based polymer segments, is preferred. A multistage polymerized propylene-based copolymer can be prepared by the continuous multistage polymerization, in any order, of crystalline homopolypropylene segments or random copolymer segments obtained by copolymerizing a small amount of an olefin other than propylene, with amorphous rubber segments copolymerized from ethylene, propylene and, as an optional ingredient, an olefin other than ethylene and propylene, in the presence of the respective polymers. Such a copolymer has an intrinsic viscosity, as measured in 1,2,3,4-tetrahydronaphthalene at 135° C., which is preferably in a range of from 0.1 to 100 dl/g. This multistage polymerized propylene-based copolymer has excellent heat resistance, rigidity and impact resistance, and can therefore be used in automotive components such as bumpers and door trim, and in various packaging containers such as retortable food packaging containers.

Moreover, in the present embodiment, to broaden the molecular weight distribution of the olefin polymer, the olefin polymer components produced in respective polymerization steps may be given different molecular weights. The present invention is also advantageous for producing olefin polymers having a broad molecular weight distribution. For example, the intrinsic viscosity obtained by measurement as described above for the polymer component obtained in the polymerization step that produces the highest molecular weight polymer component is in a range of preferably from 0.5 to 100 dl/g, more preferably from 1 to 50 dl/g, and even more preferably from 2 to 20 dl/g. This intrinsic viscosity is at least five times the intrinsic viscosity of the polymer component obtained in the polymerization step that produces the lowest molecular weight polymer component. The present invention can advantageously produce an olefin polymer in which the amount of the polymer component obtained in the polymerization step which produces the highest molecular weight polymer component accounts for from 0.1 to 80 wt % of the olefin polymer.

An olefin-based block copolymer may be formed by a process which does not use an additional polymerization reactor, but separates the multistage gas phase polymerization reactor 10A into two regions. In this case, an olefin-based block copolymer may be advantageously created by forming homopolyolefin particles in three polymerization stages from the top of the multistage gas phase polymerization reactor 10A and feeding two or more different olefins to two bottom polymerization stages. Because the ratio of homopolyolefin particle formation is generally higher than the ratio of copolymer formation, it is preferable for the number of polymerization stages used to form the homopolyolefin particles to be higher than the number of polymerization stages used to form the copolymer. Here, one olefin polymerization reaction unit according to the invention in which a single olefin circulates is composed of the three polymerization stages from the top, and another olefin polymerization reaction unit in which a gas containing a plurality of different olefins circulates is composed of the two bottom polymerization stages.

The olefin polymerization catalyst used in the invention may be a known addition polymerization catalyst used in olefin polymerization. Illustrative examples include Ziegler-type solid catalysts formed by contacting a solid catalyst component containing titanium, magnesium, a halogen and an electron donor (referred to below as "catalyst component A") with an organoaluminum compound component and an electron donor component; and metallocene-type solid catalysts prepared by supporting a metallocene compound and a cocatalyst component on a granular carrier. Combinations of these catalysts may also be used.

What is commonly referred to as a titanium/magnesium composite catalyst may be used as catalyst component A employed in the preparation of a Ziegler-type solid catalyst. This composite catalyst may be obtained by contacting a titanium compound, a magnesium compound and an electron donor such as the following. Titanium compounds that may be used to prepare catalyst component A are exemplified by titanium compounds having the general formula Ti(OR$^1$)$_a$X$_{4-a}$ (where R$^1$ is a hydrocarbon group of 1 to 20 carbons, X is a halogen atom, and the letter a is a number such that 0≦a≦4). Illustrative examples include tetrahalogenated titanium compounds such as titanium tetrachloride; trihalogenated alkoxytitanium compounds such as ethoxytitanium trichloride and butoxytitanium trichloride; dihalogenated dialkoxytitanium compounds such as diethoxytitanium dichloride and dibutoxytitanium dichloride; monohalogenated trialkoxytitanium compounds such as triethoxytitanium chloride and tributoxytitanium chloride; and tetraalkoxytitanium compounds such as tetraethoxytitanium and tetrabutoxytitanium. These titanium compounds may be used singly or as combinations of two or more thereof.

Magnesium compounds that may be used to prepare catalyst component A are exemplified by magnesium compounds which have a magnesium-carbon bond or a magnesium-hydrogen bond and have a reducing ability, and magnesium compounds which lack a reducing ability. Illustrative examples of magnesium compounds which have a reducing ability include dialkylmagnesium compounds such as dimethylmagnesium, diethylmagnesium, dibutylmagnesium and butylethylmagnesium; alkylmagnesium halides such as butylmagnesium chloride; alkylalkoxymagnesium compounds such as butylethoxymagnesium; and alkylmagnesium hydrides such as butylmagnesium hydride. These magnesium compounds having a reducing ability may also be used in the form of a complex compound with an organoaluminum compound.

Illustrative examples of magnesium compounds which lack a reducing ability include dihalogenated magnesium compounds such as magnesium dichloride; alkoxymagnesium halides such as methoxymagnesium chloride, ethoxymagnesium chloride and butoxymagnesium chloride; dialkoxymagnesium compounds such as diethoxymagnesium and dibutoxymagnesium; and magnesium carboxylates such as magnesium laurate and magnesium stearate. These magnesium compounds which lack a reducing ability may be compounds which are synthesized, either in advance or at the time of catalyst component A preparation, by a known method from a magnesium compound having a reducing ability.

Electron donors that may be used to prepare catalyst component A include oxygen-containing electron donors such as alcohols, phenols, ketones, aldehydes, carboxylic acids, esters of organic or inorganic acids, ethers, acid amides and acid anhydrides; nitrogen-containing electron donors such as ammonia, amines, nitrites and isocyanates; and organic acid halides. Of these electron donors, the use of inorganic acid esters, organic acid esters and ethers is preferred.

Preferred inorganic acid esters include silicon compounds having the general formula R$^2_n$Si(OR$^3$)$_{4-n}$ (where R$^2$ is a hydrocarbon group of 1 to 20 carbons or a hydrogen atom, R$^3$ is a hydrocarbon group of 1 to 20 carbons, and the letter n is a number such that 0≦n≦4). Illustrative examples include tetraalkoxysilanes such as tetramethoxysilane, tetraethoxysilane and tetrabutoxysilane; alkyltrialkoxysilanes such as methyltrimethoxysilane, ethyltrimethoxysilane, butyltrimethoxysilane, isobutyltrimethoxysilane, t-butyltrimethoxysilane, methyltriethoxysilane, ethyltriethoxysilane, butyltriethoxysilane, isobutyltriethoxysilane and t-butyltriethoxysilane; and dialkyldialkoxysilanes such as dimethyldimethoxysilane, diethyldimethoxsilane, dibutyldimethoxysilane, diisobutyldimethoxysilane, di-t-butyldimethoxysilane, butylmethyldimethoxysilane, butylethyldimethoxysilane, t-butylmethyldimethoxysilane, dimethyldiethoxysilane, diethyldiethoxysilane, dibutyldiethoxysilane, diisobutyldiethoxysilane, di-t-butyldiethoxysilane, butylmethyldiethoxysilane, butylethyldiethoxysilane and t-butylmethyldiethoxysilane.

Preferred organic acid esters include monofunctional and polyfunctional carboxylic acid esters, such as aliphatic carboxylic acid esters, alicyclic carboxylic acid esters and aromatic carboxylic acid esters. Illustrative examples include methyl acetate, ethyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, diethyl phthalate, di-n-butyl phthalate and diisobutyl phthalate. Preferred examples include unsaturated aliphatic carboxylic acid esters such as methacrylic acid esters, and phthalic acid esters and maleic acid esters. Phthalic acid diesters are more preferred.

Illustrative examples of ethers include dialkyl ethers such as diethyl ether, dibutyl ether, diisobutyl ether, diamyl ether, diisoamyl ether, methyl butyl ether, methyl isoamyl ether and ethyl isobutyl ether. Preferred examples include dibutyl ether and diisoamyl ether.

Illustrative examples of organic acid halides include mono- and polyfunctional carboxylic acid halides, such as aliphatic carboxylic acid halides, alicyclic carboxylic acid halides and aromatic carboxylic acid halides. Illustrative examples include acetyl chloride, propionyl chloride, butyryl chloride, valeroyl chloride, acryloyl chloride, methacryloyl chloride, benzoyl chloride, toluoyl chloride, anisoyl chloride, suceinyl chloride, malonyl chloride, maleyl chloride, itaconyl chloride and phthaloyl chloride. Preferred examples include aromatic carboxylic acid chlorides such as benzoyl chloride, toluoyl chloride and phthaloyl chloride. Phthaloyl chloride is especially preferred.

Examples of methods for preparing catalyst component A include the following.

(1) Reacting a liquid magnesium compound, or a complex compound of a magnesium compound and an electron donor, with a precipitating agent, then treating with a titanium compound or with a titanium compound and an electron donor.

(2) Treating a solid magnesium compound, or a complex compound of a solid magnesium compound and an electron donor, with a titanium compound or with a titanium compound and an electron donor.

(3) Reacting a liquid magnesium compound with a liquid titanium compound in the presence of an electron donor, and inducing the precipitation of a solid titanium complex.

(4) Further treating the reaction product obtained in method (1), (2) or (3) above with a titanium compound, or with an electron donor and a titanium compound.

(5) A method in which a solid product obtained by reducing an alkoxytitanium compound with an organomagnesium compound such as a Grignard reagent in the presence of an organosilicon compound having a Si—O bond is treated with an ester compound, an ether compound and titanium tetrachloride.

(6) A method in which a solid product obtained by reducing a titanium compound with an organomagnesium compound in the presence of an organosilicon compound or an organosilicon compound and an ester compound is treated by adding, in order, a mixture of an ether compound and titanium tetrachloride, followed by an organic acid halide compound, and the treated solid is subsequently treated with a mixture of an ether compound and titanium tetrachloride or a mixture of an ether compound, titanium tetrachloride and an ester compound.

(7) A method in which the product of the contact catalysis of a metal oxide, dihydrocarvyl magnesium and a halogen-containing alcohol is contacted with an electron donor and a titanium compound, either following treatment with a halogenating agent or without such treatment.

(8) A method in which a magnesium compound such as the magnesium salt of an organic acid or an alkoxymagnesium is contacted with an electron donor and a titanium compound, either following treatment with a halogenating agent or without such treatment.

(9) Treating the compound obtained in any of methods (1) to (8) above with a halogen, a halogen compound or an aromatic hydrocarbon.

Of the above methods for preparing catalyst component A, methods (1) to (6) are preferred. These methods of preparation are generally all carried out in an inert gas atmosphere, such as nitrogen or argon.

In the preparation of catalyst component A, the titanium compound, organosilicon compound and ester compound are preferably used after dissolution or dilution in a suitable solvent. Illustrative examples of such solvents include aliphatic hydrocarbons such as hexane, heptane, octane and decane; aromatic hydrocarbons such as toluene and xylene; alicyclic hydrocarbons such as cyclohexane, methylcyclohexane and decalin; and ether compounds such as diethyl ether, dibutyl ether, diisoamyl ether and tetrahydrofuran.

In the preparation of catalyst component A, the temperature of the reducing reaction which uses an organomagnesium compound is generally from −50 to +70° C. From the standpoint of catalyst activity and cost, the temperature is preferably from −30 to +50° C., and more preferably from −25 to +35° C. The dropwise addition time for the organomagnesium compound, while not subject to any particular limitation, is generally from about 30 minutes to about 12 hours. Following completion of the reducing reaction, subsequent reactions may be carried out at a temperature of from 20 to 120° C.

In the preparation of catalyst component A, the reducing reaction may be carried out in the presence of a porous material such as an inorganic oxide or an organic polymer so as to allow the solid product to impregnate into the porous material. Such porous materials preferably have a pore volume at a pore radius of from 20 to 200 nm of at least 0.3 ml/g and an average particle size of from 5 to 300 μm. Examples of porous inorganic oxides include $SiO_2$, $Al_2O_3$, MgO, $TiO_2$, $ZrO_2$ and composite oxides thereof. Examples of porous polymers include polystyrene-based porous polymers such as polystyrene and styrene-divinylbenzene copolymers; polyacrylate-based porous polymers such as polyethyl acrylate, methyl acrylate-divinyl benzene copolymers, polymethyl methacrylate and methyl methacrylate-divinylbenzene copolymers; and polyolefin-based porous polymers such as polyethylene, ethylene-methyl acrylate copolymers and polypropylene. Of these porous substances, $SiO_2$, $Al_2O_3$ and styrene-divinylbenzene copolymers are preferred.

The organoaluminum compound component used in the preparation of a Ziegler solid catalyst has at least one aluminum-carbon bond on the molecule and may typically have one of the following general formulas.

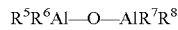

In the above formulas, $R^4$ to $R^8$ are each hydrocarbon groups having from 1 to 8 carbons, and Y is a halogen atom, hydrogen or an alkoxy group. $R^4$ to $R^8$ may each be the same or different. Also, the letter m is a number such that $2 \leq m \leq 3$.

Illustrative examples of the organoaluminum compound component include trialkylaluminums such as triethylaluminum and triisobutylaluminum; dialkylaluminum hydrides such as diethylaluminum hydride and diisobutylaluminum hydride; dialkylaluminum halides such as diethylaluminum chloride and diisobutylaluminum chloride; mixtures of a trialkylaluminum with a dialkylaluminum halide, such as a mixture of triethylaluminum with diethylaluminum chloride; and alkylalumoxanes such as tetraethyldialumoxane and tetrabutyldialumoxane. Of these organoaluminum compounds, the use of a trialkylaluminum, a mixture of a trialkylaluminum with a dialkylaluminum halide, or an alkylalumoxane is preferred. The use of triethylaluminum, triisobutylaluminum, a mixture of triethylaluminum and diethylaluminum chloride, or tetraethyldialumoxane is more preferred.

Examples of the electron donor component used in the preparation of a Ziegler solid catalyst include the following commonly used electron donors: oxygen-containing electron donors such as alcohols, phenols, ketones, aldehydes, carboxylic acids, the esters of organic or inorganic acids, ethers, acid amides and acid anhydrides; and nitrogen-containing electron donors such as ammonia, amines, nitriles and isocyanates. Of these electron donor components, inorganic acid esters and ethers are preferred.

Preferred inorganic acid esters include silicon compounds of the general formula $R^9{}_n Si(OR^{10})_{4-n}$ (where $R^9$ is a hydrocarbon group of 1 to 20 carbons or a hydrogen atom, $R^{10}$ is a hydrocarbon group of 1 to 20 carbons, and the letter n is such that $0 \leq n < 4$). Illustrative examples include tetrabutoxysilane, butyltrimethoxysilane, tert-butyl-n-propyldimethoxysilane, dicyclopentyldimethoxysilane and cyclohexylethyldimethoxysilane.

Preferred ethers include dialkyl ethers, and diether compounds of the general formula

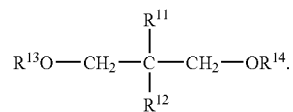

In the above formula, $R^{11}$ to $R^{14}$ are each independently a linear or branched alkyl, alicyclic hydrocarbon, aryl or aralkyl group of 1 to 20 carbons, although $R^{11}$ or $R^{12}$ may be a hydrogen atom. Illustrative examples include dibutyl ether, diamyl ether, 2,2-diisobutyl-1,3-dimethoxypropane and 2,2-dicyclopentyl-1,3-dimethoxypropane.

Of these electron donor components, an organosilicon compound of the general formula $R^{15}R^{16}Si(OR^{17})_2$ is especially preferred. Here, $R^{15}$ is a hydrocarbon group of 3 to 20 carbons in which the carbon atoms neighboring the silicon are secondary or tertiary. Illustrative examples include branched chain alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. In this formula, $R^{16}$ is a hydrocarbon group of 1 to 20 carbons, illustrative examples of which include straight chain alkyl groups such as methyl, ethyl, propyl, butyl and pentyl; branched alkyl groups such as isopropyl, sec-butyl, tert-butyl and tert-amyl; cycloalkyl groups such as cyclopentyl and cyclohexyl; cycloalkenyl groups such as cyclopentenyl; and aryl groups such as phenyl and tolyl. Also, in the above formula, $R^{17}$ is a hydrocarbon group of 1 to 20 carbons, and is preferably a hydrocarbon group of 1 to 5 carbons. Illustrative examples of organosilicon compounds that may be used as such electron donor components include tert-butyl-n-propyldimethoxysilane, dicyclopentyldimethoxysilane and cyclohexylethyldimethoxysilane.

In the preparation of a Ziegler solid catalyst, the organoaluminum compound component is used in an amount, per mole of titanium atoms in catalyst component A, of generally from 1 to 1,000 moles, and preferably from 5 to 800 moles. The electron donor component is used in an amount, per mole of titanium atoms in catalyst component A, of generally from 0.1 to 2,000 moles, preferably from 0.3 to 1,000 moles, and more preferably from 0.5 to 800 moles.

Catalyst component A, the organoaluminum compound component and the electron donor component may be brought into mutual contact before being fed to the multistage gas phase polymerization reactor, or may be separately fed to the multistage gas phase polymerization reactor, then contacted within the reactor. Alternatively, any two of these components may first be contacted with each other, and the remaining component subsequently brought into contact, or the respective components may be brought into mutual contact in a plurality of divided portions.

Examples of metallocene compounds that may be used to prepare the metallocene-type solid catalyst include transition metal compounds of the following general formula.

$$L_xM$$

In the formula, M is a transition metal, x is a number which satisfies the atomic valence of the transition metal M, and L is a ligand attached to the transition metal. At least one occurrence of t is a ligand having a cyclopentadienyl skeleton.

The transition metal M is preferably an atom from groups 3 to 6 of the Periodic Table of the Elements (IUPAC, 1989), and more preferably titanium, zirconium or hafnium.

Ligands L having a cyclopentadienyl skeleton are exemplified by (substituted) cyclopentadienyl groups, (substituted) indenyl groups and (substituted) fluorenyl groups. Illustrative examples include cyclopentadienyl, methylcyclopentadienyl, tert-butylcyclopentadienyl, dimethylcyclopentadienyl, tert-butylmethylcyclopentadienyl, methylisopropylcyclopentadienyl, trimethylcyclopentadienyl, tetramethylcyclopentadienyl, pentamethylcyclopentadienyl, indenyl, 4,5,6,7-tetrahydroindenyl, 2-methylindenyl, 3-methylindenyl, 4-methylindenyl, 5-methylindenyl, 6-methylindenyl, 7-methylindenyl, 2-tert-butylindenyl, 3-tert-butylindenyl, 4-tert-butylindenyl, 5-tert-butylindenyl, 6-tert-butylindenyl, 7-tert-butylindenyl, 2,3-dimethylindenyl, 4,7-dimethylindenyl, 2,4,7-trimethylindenyl, 2-methyl-4-isopropylindenyl, 4,5-benzindenyl, 2-methyl-4,5-benzindenyl, 4-phenylindenyl, 2-methyl-5-phenylindenyl, 2-methyl-4-phenylindenyl, 2-methyl-4-naphthylindenyl, fluorenyl, 2,7-dimethylfluorenyl, 2,7-di-tert-butylfluorenyl and substituted versions of the above. In cases where there are a plurality of ligands having a cyclopentadienyl skeleton, these ligands may be mutually like or unlike.

Ligands L other than those having a cyclopentadienyl skeleton are exemplified by heteroatom-bearing groups, halogen atoms and hydrocarbon groups (excluding groups having a cyclopentadiene-type anion skeleton).

Examples of the heteroatom in the heteroatom-bearing group include oxygen, sulfur, nitrogen and phosphorus atoms. Such groups are exemplified by alkoxy groups, aryloxy groups, thioalkoxy groups, thioaryloxy groups, alkylamino groups, arylamino groups, alkylphosphino groups, arylphosphino groups, and aromatic or aliphatic heterocyclic groups having on the ring at least one atom selected from among oxygen, sulfur, nitrogen and phosphorus atoms. Illustrative examples of the halogen atoms include fluorine, chlorine, bromine and iodine atoms. The hydrocarbon groups are exemplified by alkyl, aralkyl, aryl and alkenyl groups.

Two or more ligands L may be directly linked to each other or may be linked through a residue containing at least one type of atom selected from among carbon, silicon, nitrogen, oxygen, sulfur and phosphorus atoms. Illustrative examples of such residues include alkylene groups such as methylene, ethylene and propylene; substituted alkylene groups such as dimethylmethylene (isopropylidene) and diphenylmethylene; silylene groups; substituted silylene groups such as dimethylsilylene, diethylsilylene, diphenylsilylene, tetramethyldisilylene and dimethoxysilylene; and heteroatoms such as nitrogen, oxygen, sulfur and phosphorus. Of these, methylene, ethylene, dimethylmethylene (isopropylidene), diphenylmethylene, dimethylsilylene, diethylsilylene, diphenylsilylene and dimethoxysilylene are especially preferred.

Illustrative examples of metallocene compounds include bis(cyclopentadienyl)zirconium dichloride, bis(methylcyclopentadienyl)zirconium dichloride, bis(indenyl)zirconium dichloride, bis(4,5,6,7-tetrahydroindenyl)zirconium dichloride, ethylenebis(indenyl)zirconium dichloride, dimethylsilylenebis(trimethylcyclopentadienyl)zirconium dichloride, dimethylsilylenebis(indenyl)zirconium dichloride and dimethylsilyl(tetramethylcyclopentadienyl)(3,5-di-tert-butyl-2-phenoxy)titanium dichloride. Additional examples include compounds in which the dichloride has been substituted with dimethoxide or diphenoxide groups.

Cocatalyst components that may be used in the preparation of metallocene-type solid catalysts include organoaluminumoxy compounds, organoaluminum compounds and boron compounds.

Illustrative examples of the organoaluminumoxy compounds include tetramethyldialuminoxane, tetraethyldialuminoxane, tetrabutyldialuminoxane, tetrahexyldialuminoxane, methylaluminoxane, ethylaluminoxane, butylaluminoxane and hexylaluminoxane.

Illustrative examples of organoaluminum compounds include trimethylaluminum, triethylaluminum, tri-n-butylaluminum, triisobutylaluminum and tri-n-hexylaluminum.

Illustrative examples of boron compounds include tris(pentafluorophenyl)borane, triphenylcarbenium tetrakis(pentafluorophenyl) borate, tri(n-butyl)ammonium tetrakis(pentafluorophenyl) borate and N,N-dimethylanilinium tetrakis(pentafluorophenyl) borate.

The granular carrier that may be used in the preparation of metallocene solid catalysts is preferably a porous substance, illustrative examples of which include inorganic oxides such as $SiO_2$, $Al_2O_3$, MgO, $ZrO_2$, $TiO_2$, $B_2O_3$, CaO, ZnO, BaO and $ThO_2$; clays or clayey minerals such as smectite, montmorillonite, hectorite, laponite and saponite; and organic polymers such as polyethylene, polypropylene and styrene-divinyl benzene copolymer.

Metallocene-type solid catalysts that may be used include those mentioned in, for example, Japanese Patent Application Laid-open No. S 60-35006, Japanese Patent Application Laid-open No. S 60-35007, Japanese Patent Application Laid-open No. S 60-35008, Japanese Patent Application Laid-open No. S 61-108610, Japanese Patent Application Laid-open No. S 61-276805, Japanese Patent Application Laid-open No. S 61-296008, Japanese Patent Application Laid-open No. S 63-89505, Japanese Patent Application Laid-open No. H 3-234709, Japanese Translation of PCT Application No. H 5-502906, Japanese Patent Application Laid-open No. H 6-336502 and Japanese Patent Application Laid-open No. H 7-224106.

When a metallocene-type solid catalyst is used in olefin polymerization, a cocatalyst component such as an organoaluminum compound or a boron compound may be used together if necessary. In such cases, the metallocene-type solid catalyst and the cocatalyst component may be brought into mutual contact prior to being fed into the polymerization reactor, or may be separately fed into the polymerization reactor and contacted within the reactor. Alternatively, the respective components may be brought into mutual contact in a plurality of divided portions.

The mass mean particle diameter of the above olefin polymerization catalyst is generally from 5 to 150 µm. In a gas phase polymerization reactor in particular, to suppress the scattering of particles to the reactor exterior, it is desirable to use a catalyst having a mass mean particle diameter of preferably at least 10 µm, and more preferably at least 15 µm. The polymerization catalyst in the present embodiment may include additives such as a fluidization aid and an antistatic additive. Together with the polymerization catalyst of the present embodiment, concomitant use may also be made of a chain transfer agent such as hydrogen for the purpose of regulating the molecular weight of the polymer.

The olefin polymerization catalyst may be a so-called prepolymerization catalyst which first induces polymerization in a small amount of olefin. Examples of olefins that may be used in prepolymerization include the olefins that may be used in the above-described polymerization. In this case, a single type of olefin may be used alone, or two or more different olefins may be used together.

Methods for producing the prepolymerization catalyst include, but are not limited to, slurry polymerization and gas phase polymerization. Of these, slurry polymerization is preferred. The use of the latter in production is sometimes economically advantageous. Production may be carried out using a batch system, a semibatch-type system or a continuous system.

The mass mean particle diameter of the prepolymerization catalyst is generally from 5 to 1,000 µm. In a gas phase polymerization reactor in particular, to minimize scatter to the exterior of the reactor, the mass mean particle diameter is preferably at least 10 µm, and more preferably at least 15 µm. Moreover, it is desirable for the amount of prepolymerization catalyst having a particle diameter of less than 20 µm, and especially less than 10 µm, to be low.

The polymerization catalyst may be introduced into the reactor as a suspension in a hydrocarbon solvent or the like. Introduction by entrainment with monomer gas or an inert gas such as nitrogen is also possible.

Polyolefin Production Process

Next, the process of producing a polyolefin in such an olefin polymerization reaction unit is described.

First, polyolefin particles containing a catalyst component having polymerization activity are formed in the olefin prepolymerization reactor 5 by a known method using an olefin polymerization catalyst.

Separately from the above, an olefin monomer gas is fed via line L30 into the multistage gas phase polymerization reactor 10A from the nozzle 40, the pressure is raised to the polymerization pressure, and the interior of the cylinder 12 is heated. The polymerization pressure, which may be any pressure within a range at which the olefin is capable of being present in the reactor as a gas phase, is generally from standard pressure to 10 MPaG, preferably from 0.2 to 8 MPaG, and more preferably from 0.5 to 5 MPaG. At a polymerization pressure below standard pressure, the productivity may decrease. On the other hand, at a reaction pressure above 10 MPaG, equipment costs for the reactor may become high. The polymerization temperature varies according to the type of monomer, the molecular weight of the product and other factors, although a temperature below the melting point of the olefin polymer, and preferably at least 10° C. lower than the melting point, is desirable. Specifically, the temperature is preferably from 0 to 120° C., more preferably from 20 to 100° C., and even more preferably from 40 to 100° C. It is preferable to carry out polymerization in an environment which is substantially free of moisture. The presence of moisture may lower the polymerization activity of the polymerization catalyst. Also, the presence of excess oxygen, carbon monoxide or carbon dioxide within the polymerization reaction system may lower the polymerization activity.

Next, polyolefin particles having a particle diameter of from about 0.5 mm to about 5.0 mm which have been obtained separately by a known method are fed to the cylinder 12 through a feed line (not shown) and line L5. The polyolefin particles fed into the cylinder 12 are most often particles which do not contain a catalyst component having a polymerization activity, although the presence within the particles of a catalyst component having a polymerization activity is acceptable.

When polyolefin particles are fed while feeding an olefin monomer gas from the nozzle 40, as shown in FIG. 2, a spouted bed of polyolefin particles is formed within the polymerization stage 25. That is, under the action of the gas from the gas inlet orifice, the particle concentration thins near the center axis of the cylinder 12 in the polymerization stage 25 and a spout is formed in which particles flow upward together with the gas. Meanwhile, an annular structure of particles falling in the manner of a moving bed under the influence of gravity is formed at the periphery thereof, giving rise to the circulatory movement of particles within the polymerization stage 25.

Once a spouted bed has been formed within each polymerization stage 25, the polyolefin particles containing a catalyst component having a polymerization activity that were formed in the olefin prepolymerization reactor 5 are fed from line L5 into the cylinder 12 at a constant rate per unit time, in addition to which recycling is carried out by the first circulating means 90A and the second circulating means 90B, thereby commencing steady-state operation of the multistage gas phase polymerization reactor 10A. As the polyolefin particles containing a catalyst component having a polymerization activity grow within each polymerization stage 25, they successively fall through the upper downcomers 35a and into the polymerization stage 25 below, and are eventually discharged from the bottom downcomer 35b.

In cases where an olefin prepolymerization reactor 5 is not used, olefin polymerization catalyst particles having a particle size of about 10 to about 500 µm may be fed directly into the cylinder 12.

Meanwhile, part of the olefin monomer-containing gas forms a spout and sweeps past the particle bed, while the remainder of the gas diffuses into the portion of the particle bed having an annular structure. In this way, the olefin-containing gas and the polyolefin particles undergo solid-gas contact and the action of the catalyst within the polyolefin particles causes the olefin polymerization reaction to proceed, resulting in growth of the polyolefin particles.

For a stable spouted bed to form in each polymerization stage 25, it is preferable that the following operating condition be satisfied; i.e., that the gas superficial velocity $U_0$ be equal to or greater than the minimum gas superficial velocity Ums at which a spouted bed is capable of forming. In addition to the physical properties of the powder and gases being handled, the minimum gas superficial velocity Ums is also influenced by the shape of the polymerization reactor. Various formulas have been proposed for calculating the minimum gas superficial velocity Ums. One example is formula (1) below.

$$Ums = \frac{d_P}{d_B}\left(\frac{d_A}{d_B}\right)^{1/3}\sqrt{\frac{2gL_S(\rho_S - \rho_G)}{\rho_G}} \times \left(\frac{\rho_G}{\rho_{AIR}}\right)^{0.2} \quad (1)$$

In this formula, $d_P$ is the particle diameter, $\rho_S$ is the particle density, $\rho_G$ is the gas density under the pressure and temperature conditions of the polymerization stage, $\rho_{AIR}$ is the density of air under room temperature conditions, and $L_S$ is the height of the spouted bed.

The spouted bed height $L_S$ within the polymerization stage 25 is equal to or less than the maximum spouted bed height $L_{S_{MAX}}$ at which a spouted bed is capable of forming, and is not subject to any particular limitation provided it is equal to or less than the maximum spouted bed height $L_{S_{MAX}}$. Various formulas for calculating the maximum spouted bed height $L_{S_{MAX}}$ have been proposed, one of which is formula (2) below.

$$\frac{L_{S_{MAX}}}{d_B} = \frac{d_B}{d_A}\left\{0.218 + \frac{0.005(\rho_S - \rho_G)gd_A}{\rho_G u_t u_{mf}}\right\} \quad (2)$$

In this formula, $u_t$ is the terminal velocity of the particles, and $u_{mf}$ is the minimum fluidization velocity.

From the standpoint of volume efficiency and enabling the formation of a more stable spouted bed, it is preferable for the spouted bed height $L_s$ to be higher than the tubular baffle 30.

In recycling by the first circulating means 90A, unreacted olefin monomer-containing gas is removed from the topmost stage and cooled by the heat exchanger 65 to a degree that the gas does not condense and fed to the bottommost stage of the cylinder 12. This enables the removal of heat generated by the olefin polymerization reaction.

In recycling by the second circulating means 90B, olefin monomer-containing gas is removed from the third polymerization stage from the top of the cylinder 12 and condensed by the condensing unit 66, and the condensate is fed to the second polymerization stage from above by the liquid feed nozzle 50. In this case, when liquid olefin monomer evaporates within the cylinder 12, heat can be efficiently removed from the polyolefin particles, particularly by the heat of vaporization. In this way, the temperatures in the respective polymerization stages 25 within the cylinder 12 can be kept from becoming successively higher at higher polymerization stages, thus making it possible to equalize the temperature at the different polymerization stages 25 in the cylinder 12. A plurality of the second circulating means 90B may be provided. From the standpoint of equalizing the temperature of the respective polymerization stages 25 within the cylinder 12, it is preferable for a plurality of the second circulating means 90B to be provided.

The olefin polymerization reaction unit of the present embodiment provides the advantage that, in olefin polymerization using a multistage gas phase polymerization reactor 10A, as described above, the heat of vaporization can be utilized, enabling heat removal to be efficiently carried out.

Also, because condensation is carried out by the second heat exchanger 66a, which is separate and distinct from the first heat exchanger 65, the amount of gas fed to the first heat exchanger 65 can be reduced. That is, the capacity of the circulating gas compressor 64 which circulates gases in the first circulating means 60A can be lowered, enabling the power costs to be cut.

Also, in the second heat exchanger 66a, because a negative pressure acts on the internal space to the decrease in volume when the gas condenses, the gas is automatically drawn into the heat exchanger 66a from the cylinder 12 through line L41. Moreover, the liquid (condensate) resulting from gas condensation can be fed into the polymerization reactor under its own head pressure without using a pump. In cases such as when the head pressure is insufficient, it is necessary to use a pump 52. However, even in this case, the pump capacity need only be of a degree that compensates for the degree of inadequacy in the head pressure. Therefore, providing second circulating means 90B having a second heat exchanger 66a does not raise the power costs to any great degree and has, in the overall scheme, a high power cost-cutting effect.

The second circulating means 90B, which differs from the first circulating means 90A, enables gases to be removed from a desired polymerization stage and also enables condensate to be fed to a desired polymerization stage. Accordingly, because it is able to selectively cool in particular a polymerization stage for which a decrease in temperature is desired, such as the uppermost polymerization stage or a polymerization stage near the uppermost stage, temperature control within the multistage gas phase polymerization reactor 10A is easy. A plurality of the second circulating means 90B may, of course, be provided.

Also, the second circulating means 90B feeds condensate to the next polymerization stage above the polymerization stage from which gases have been removed. By feeding condensate close to the polymerization stage from which gases have been removed, an amount of gas equal to the amount that has been removed is replenished at a nearby polymerization stage. Therefore, the gas flow rate in each polymerization stage within the multistage gas phase polymerization reactor can be kept substantially uniform, making the spouted state of the particles easy to control.

The invention is not limited to the above-described embodiment. In the foregoing embodiment, the multistage gas phase polymerization reactor 10A is one in which gas discharge nozzles 60 are provided at the third polymerization stage from the top and the liquid feeding nozzle 50 is provided at the second polymerization stage from the top. However, the gas discharge nozzles 60 and the liquid feeding nozzle 50 are not limited to these positions, and may each be independently disposed at any position. To keep the gas flow rate at each polymerization stage substantially constant, it is preferable for the gas discharge nozzles 60 to be situated at the same polymerization stage as the liquid feeding nozzle 50 or at a later polymerization stage.

Also, in the above embodiment, the multistage gas phase polymerization reactor 10A was exemplified by a multistage gas phase polymerization reactor in which five spouted beds formed in the vertical direction. However, the number of spouted beds is not limited to five, and may be any number equal to or greater than two. From the standpoint of achieving a sufficient plug flow effect, the number of spouted beds is preferably at least three, and more preferably at least six. Moreover, the plurality of spouted beds need not necessarily be formed in the vertical direction. For example, a plurality of reactors within each of which a single spouted bed is formed at the interior may be arranged in a horizontal direction and coupled in series. Also, in reactor design and the operation control method, it is preferable to design the volume of each reactor stage and control the polyolefin particle hold-up or residence time in such a way as to narrow the residence time distribution of the polyolefin particles and to make the amount of polyolefin produced at each stage (including the olefin prepolymerization reactor 5) more uniform.

Second Embodiment

In the above-described first embodiment of the invention, a reactor where a spouted bed is formed in each polymerization stage is used. However, it is possible to use instead a reactor in which a fluidized bed is formed in each polymerization stage. The multistage gas phase polymerization reactor 10B of the olefin polymerization reaction unit 100B according to the second embodiment of the invention shown in FIG. 3 is a reactor in which a fluidized bed is formed in each polymerization stage.

Figure 3:
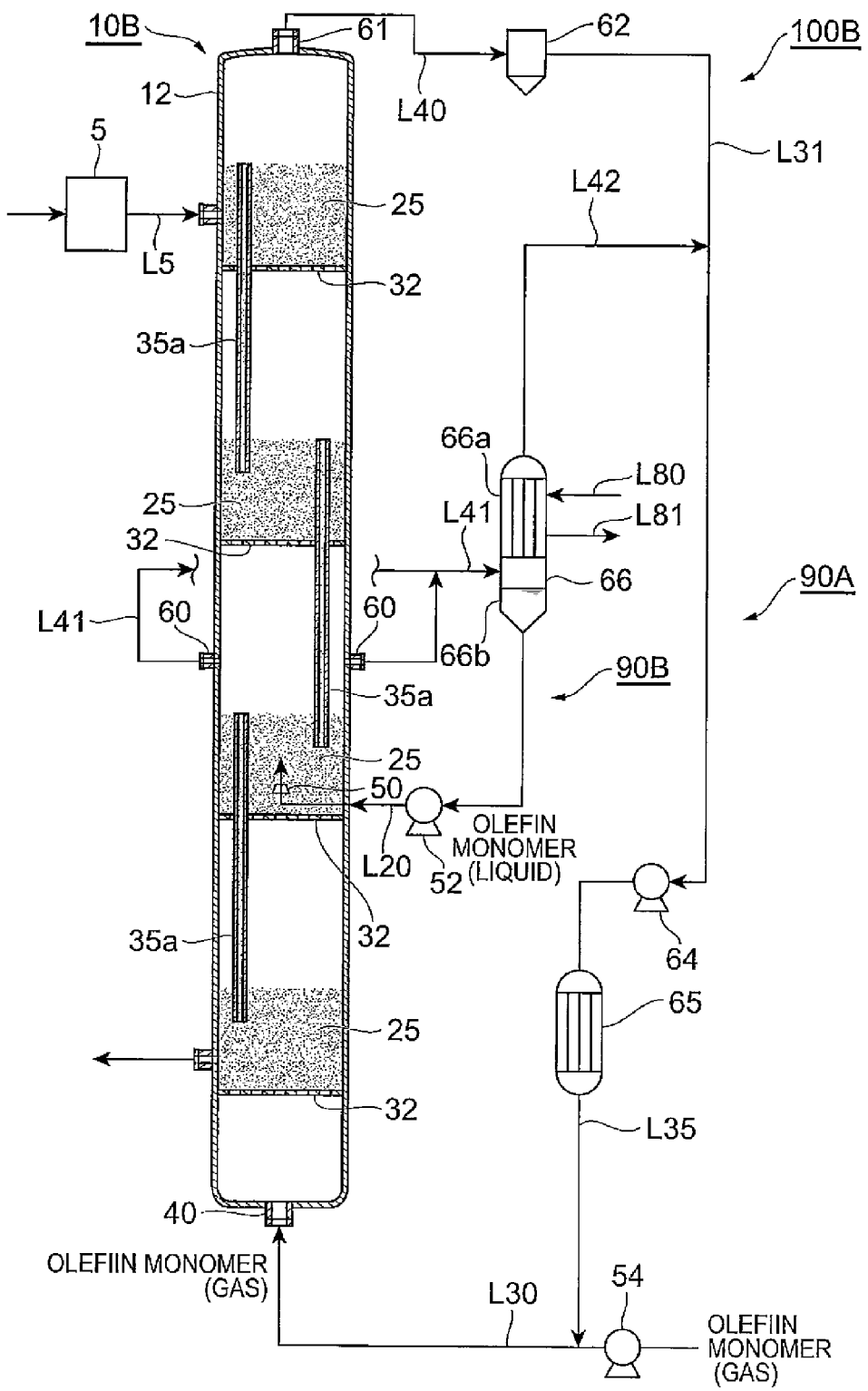
FIG. 3 is a schematic view of another embodiment of the olefin polymerization reaction unit according to the invention.

As shown in FIG. 3, the multistage gas phase polymerization reactor 10B is composed primarily of a cylinder 12 which extends in the vertical direction and a plurality of dispersion plates 32 provided inside the cylinder 12. The dispersion plates 32 are arranged at equal intervals in the axial direction of the cylinder 12. Aside from the dispersion plates 32, the reactor construction is the same as that of the multistage gas phase polymerization reactor 10A in the first embodiment shown in FIG. 1.

In the multistage gas phase polymerization reactor 10B, four polymerization stages 25 are formed in a row in the vertical direction within the cylinder 12. Gas discharge nozzles 60 and a liquid feeding nozzle 50 are situated at the third polymerization stage from the top. The bottom three polymerization stages 25 are each regions enclosed by the bottom surface of a dispersion plate 32, the top surface of the dispersion plate 32 directly below, and the inside surface of that portion of the cylinder 12 (cylindrical portion) located between these two dispersion plates 32. The topmost polymerization stage 25 is a region enclosed by the inside surface of the top of the cylinder 12, the upper surface of the dispersion plate 32 directly below, and the inside surface of that portion of the cylinder 12 (cylindrical portion) located therebetween.

In each polymerization stage 25, a fluidized bed of polyolefin particles is formed due to the inward and upward flow of olefin-containing gases at a high velocity from gas inlet orifices in the dispersion plate 32.

As shown in FIG. 3, downcomers 35*a* are provided so as to pass through the top three dispersion plates 32 provided within the cylinder 12. The downcomers 35*a* allow polyolefin particles to drop down from an upper polymerization stage 25 to a lower polymerization stage 25. A particle removing line which laterally removes polyolefin particles is provided at the bottommost polymerization stage 25. Polyolefin particles are discharged to the next step through this particle removing line.

In this embodiment, as in the earlier described embodiment, the first circulating means 90A and the second circulating means 90B are able to reduce power costs and achieve desirable effects such as efficient heat removal from the polyolefin particles by a latent heat of vaporization.

What is claimed is:

1. A polyolefin production process which comprises carrying out olefin polymerization using an olefin polymerization reaction unit comprising:
a multistage gas phase polymerization reactor which is divided into two or more polymerization stages, in which polyolefin particles move from an initial stage to a final stage, and in which an olefin monomer-containing gas is fed from the final stage toward the initial stage;
first circulating means for feeding to the final stage a gas, wherein the gas is discharged from the initial stage and then cooled with a first heat exchanger; and
second circulating means for feeding to one of the polymerization stages a condensate, wherein the condensate is formed by condensing, with a second heat exchanger different from the first heat exchanger, a gas removed from one of the polymerization stages,
wherein the second circulating means feeds the condensate to the polymerization stage immediately before the polymerization stage from which gas is removed.

2. The polyolefin production process of claim 1, wherein the two or more polymerization stages are arranged in a vertical direction.

3. The polyolefin production process of claim 1, wherein the second heat exchanger is situated upward from where the condensate is fed to one of the polymerization stages.

4. The polyolefin production process of claim 1, wherein a fluidized bed of the polyolefin particles is formed in each polymerization stage.

5. The polyolefin production process of claim 1, wherein a spouted bed of the polyolefin particles is formed in each polymerization stage.

* * * * *